United States Patent
Choi et al.

(10) Patent No.: US 7,390,392 B1
(45) Date of Patent: Jun. 24, 2008

(54) METHOD OF IN-SITU MONITORING A REDUCTION OF URANIUM OXIDES BY LITHIUM METAL

(75) Inventors: In-Kyu Choi, Daejeon (KR); Young-Hwan Cho, Daejeon (KR); Jei-Won Yeon, Daejeon (KR); Won-ho Kim, Daejeon (KR); Taek-Jin Kim, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 815 days.

(21) Appl. No.: 10/862,253

(22) Filed: Jun. 7, 2004

(30) Foreign Application Priority Data

Jan. 12, 2004 (KR) .................... 10-2004-0002054

(51) Int. Cl.
*G01F 1/64* (2006.01)
(52) U.S. Cl. .................. 205/781.5; 205/43; 205/46; 205/704; 205/790
(58) Field of Classification Search ............. 204/403.01
See application file for complete search history.

(56) References Cited

U.S. PATENT DOCUMENTS

| | | | | |
|---|---|---|---|---|
| 5,389,123 A | * | 2/1995 | Bronson | 75/393 |
| 6,299,748 B1 | * | 10/2001 | Kondo et al. | 205/47 |
| 6,540,902 B1 | * | 4/2003 | Redey et al. | 205/354 |
| 2004/0007466 A1 | * | 1/2004 | Seo et al. | 205/43 |

OTHER PUBLICATIONS

Usami, T. et al., "Pyrochemical reduction of uranium dioxide and plutonium dioxide by lithium metal", Journal of Nuclear Materials, vol. 300, (Jan. 2002), pp. 15-26.*
Usami, T. et al, "Lithium reduction of americium dioxide to generate americium metal", Journal of Nuclear Materials, vol. 304, (Jul. 2002), pp. 50-55.*
Xu, Qian, et al., "Electrochemical investigation of lithium and tin reduction at a graphite cathode in molten chlorides", Journal of Electroanalytical Chemistry, vol. 562, (Jan. 15, 2004), pp. 15-21.*

* cited by examiner

*Primary Examiner*—Barbara L. Gilliam
*Assistant Examiner*—J. Christopher Ball
(74) *Attorney, Agent, or Firm*—Bachman & LaPointe, P.C.

(57) ABSTRACT

Disclosed is a method of in-situ monitoring a reduction process of uranium oxides by lithium metal, wherein a conversion yield of uranium metal from uranium oxides upon production of uranium metal through a reaction of uranium oxides ($UO_x$, $x \leq 3$) with lithium metal in the presence of a high-temperature molten salt is measured according to an electrochemical analysis based on an oxidation of an oxygen ion and a reduction of a lithium ion dissociated from lithium oxide obtained as a by-product of the reaction, by use of a measuring device composed of a potentiostat/galvanostat and a reactor provided with an anode and a cathode. The in-situ monitoring method of the current invention is advantageous in terms of fast and simplified measuring techniques, by directly measuring the reduction process of uranium oxides at the anode and cathode connected to the potentiostat/galvanostat in the presence of the high-temperature molten salt.

8 Claims, 3 Drawing Sheets

METHOD OF IN-SITU MONITORING A REDUCTION OF URANIUM OXIDES BY LITHIUM METAL

BACKGROUND OF THE INVENTION

1. Field of the Invention

The present invention relates to a method of in-situ monitoring a reduction process of uranium oxides to uranium metal by use of lithium metal.

2. Description of the Related Art

Nuclear reactors, pressurized water reactors (PWR) and pressurized heavy-water reactors (PHWR), using $UO_2$ as a nuclear fuel, generate electricity through a fission process and additionally produce fission products. Thus, spent fuel is composed of uranium oxides and fission products. However, since some elements of the fission products may absorb neutrons required to maintain the fission, oxide fuel performance is decreased in combustion efficiency. Eventually, the spent fuel with low efficiency is permanently disposed of to high-level radioactive wastes or re-treated to be recycled to uranium. Typically represented by PUREX (Plutonium Uranium Recovery by EXtraction), a wet re-treatment process is employed to purely separate plutonium, which is applicable exclusively for manufacturing nuclear weapons. Hence, to achieve nuclear proliferation resistance, the wet re-treatment process is not allowed to be performed, with the exception of United States and some countries. On the other hand, a molten salt based process is known not to enable plutonium to be purely separated, and has the advantage of proliferation resistance. Accordingly, the molten salt process, which serves to remove the fission products from uranium following the reduction of the spent oxide fuel to uranium metal, is under study so as to be used for recycling uranium as a fuel or disposing such uranium to intermediate- or low-level radioactive wastes.

Useful for recycling the uranium fuel, a reduction process of uranium oxide by use of lithium in the presence of a high-temperature molten salt is represented by Reaction 1, below:

Reaction 1

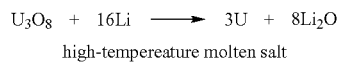

high-tempereature molten salt

As shown in Reaction 1, after lithium chloride to be used as the molten salt and the spent oxide fuel are supplied to a reduction reactor, the temperature in the reactor is increased to 650° C. to melt lithium chloride, which functions as a solvent in the molten state. Subsequently, lithium metal is added into the reactor under inert (Ar) atmosphere with stirring of the molten salt, whereby lithium metal reacts with uranium oxide, therefore resulting in reduction of uranium oxide to uranium metal and production of lithium oxide as a by-product. In this case, since uranium metal is not dissolved in the salt, it is settled down as a solid state. Also, lithium oxide which is the by-product is dissolved, with 8.7 wt % solubility in the salt at 650° C. Eventually, uranium metal powders can be obtained by removal of the molten salt composed of lithium chloride and parts of lithium oxide.

Meanwhile, since the molten salt based process for use in separating the fission products from uranium is developed in the absence of oxides, uranium cannot be efficiently recovered in the presence of larger amounts of oxides. Hence, the complete conversion of the spent oxide fuel to metal is regarded to be important. For this, while the conversion of the spent oxide fuel to metal is confirmed at any time, the completion of the reduction process is monitored.

In this regard, a conventional monitoring method for a reduction process of uranium oxide is exemplified by a wet analytical method, which includes collecting a lithium chloride sample molten at high temperatures during the reduction process, cooling and crushing the sample under inert gas atmosphere to weigh the sample, measuring the volume of hydrogen produced due to dissolve the sample with distilled water, and then titrating the solution with an acid.

Lithium metal has a 0.5 mol % solubility in a pure lithium chloride molten at 650° C. As the concentration of lithium oxide increases, solubility of lithium metal increases. Accordingly, when lithium oxide is dissolved in distilled water and then titrated with an acid, the amount of lithium hydroxide resulting from the reaction of lithium metal dissolved in lithium chloride with water should be corrected.

Specifically, according to the wet analytical method, the volume of hydrogen generated by the reaction of lithium metal contained in the lithium chloride sample with distilled water is measured by use of a hydrogen volumetric unit, to preferentially measure the amount of lithium metal contained in the sample. Thereafter, the solution produced in the hydrogen volumetric unit is titrated with an acid to obtain a total amount of lithium oxide, from which the amount of lithium metal obtained by the measurement of the hydrogen volume is subtracted, thereby accurately determining an amount of lithium oxide produced by uranium oxide.

However, the above wet analytical method is disadvantageous in that the amount of lithium metal is difficult to be accurately measured, since the temperature should be maintained at a predetermined level to measure the volume of hydrogen. Further, the above method has the drawbacks, such as impossibility of direct measurement of a conversion yield of uranium from uranium oxides upon the reduction process, and complicated analytical procedures of collecting the sample, weighing the cooled sample, crushing and dissolving the sample, etc.

SUMMARY OF THE INVENTION

Therefore, it is an object of the present invention to alleviate conventional problems for monitoring a reduction process of uranium oxides in the related art, and to provide a method of in-situ monitoring a reduction process of uranium oxides with the use of lithium metal, which is advantageous in terms of in-situ and simplified measurement of a conversion yield of uranium from uranium oxides.

To achieve the above object, the present invention provides a method of measuring a conversion yield of uranium metal from uranium oxides upon production of uranium metal and lithium oxide resulting from a reaction of uranium oxides ($UO_x$, $x \leq 3$) with lithium metal in the presence of a high-temperature molten salt, according to an electrochemical analysis based on an oxidation of a dissociated oxygen ion and a reduction of a dissociated lithium ion as represented by Reaction 2, below, by use of a measuring device including a potentiostat/galvanostat and a reactor provided with an anode and a cathode:

Reaction 2

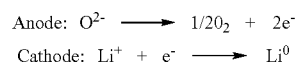

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
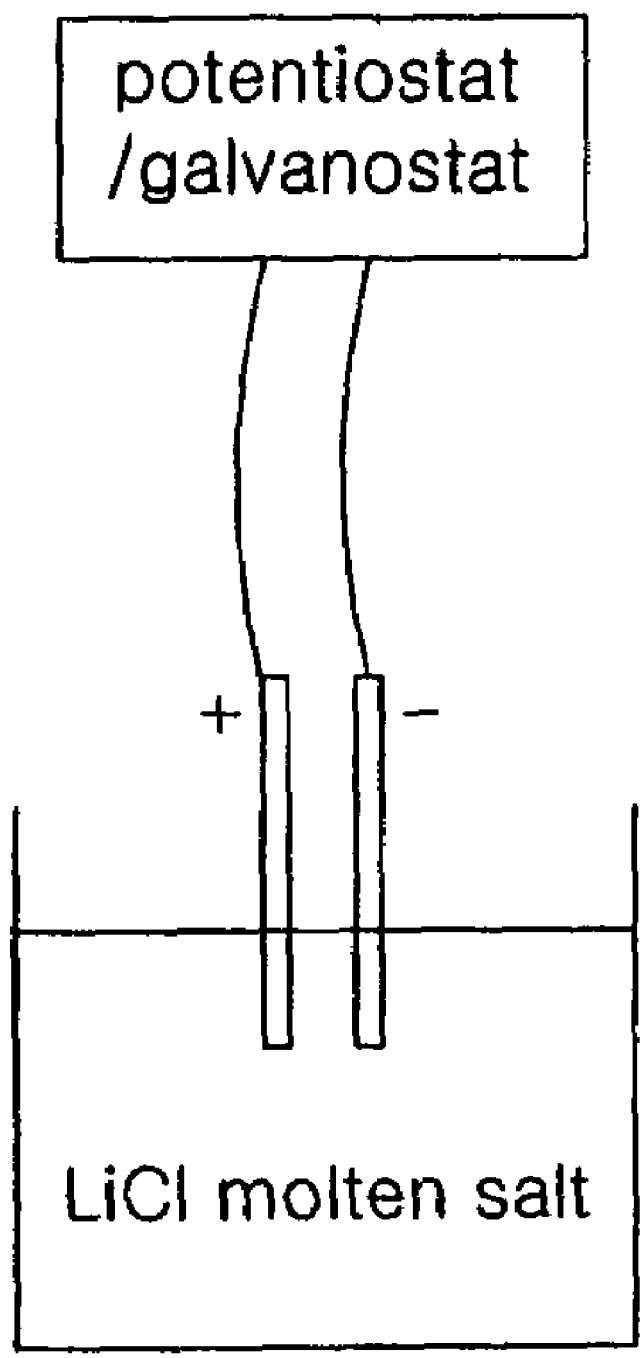
FIG. 1 is a schematic view showing a measuring device including a two-electrode system of an anode and a cathode connected to a potentiostat/galvanostat, for use in measuring cathodic current at electrostatic potential which reduces lithium ion to lithium metal at the cathode (−)

Based on the present invention, when uranium metal and lithium oxide are produced through the reaction of uranium oxides ($UO_x$, $x \leq 3$) with lithium metal in the presence of a high-temperature molten salt, a conversion yield of uranium from uranium oxides is measured according to an electrochemical analysis of an oxidation of an oxygen ion and a reduction of a lithium ion dissociated as in Reaction 2, below, by use of a measuring device consisting of a potentiostat/galvaostat and a reactor provided with an anode and a cathode:

Reaction 2

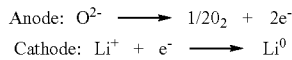

$$\text{Anode: } O^{2-} \longrightarrow 1/2 O_2 + 2e^-$$
$$\text{Cathode: } Li^+ + e^- \longrightarrow Li^0$$

The measurement method of the present invention is characterized in that (1) lithium oxide is dissolved in lithium chloride upon a reduction process of Reaction 1, and (2) electrolysis acting to reduce the dissociated lithium ion to lithium metal is directly applied.

When uranium oxide is reduced by use of lithium metal, uranium metal is produced, along with lithium oxide as a by-product of the reaction, according to Reaction 1, below:

Reaction 1

$$U_3O_8 + 16Li \xrightarrow{\text{high-tempereature molten salt}} 3U + 8Li_2O$$

As apparent from Reaction 1, the amount of lithium oxide increases, depending on uranium metal produced in larger amounts. Thus, cathodic current resulting from the electrolysis of lithium oxide increases, quantitatively, in proportion to the amount of produced uranium metal. At this time, the electrolysis of pure lithium chloride molten results in oxidation of chlorine ion to chlorine gas and reduction of lithium ion to lithium metal. Lithium oxide has a 8.7 wt % solubility in the molten chloride salt at 650° C., and is dissociated into an oxygen ion and a lithium ion. Further, when lithium oxide is subjected to electrolysis, oxygen gas is produced at an anode, instead of the chlorine gas. A cell potential is drastically decreased (by about 1.0 V) in the presence of lithium oxide than in the absence of lithium oxide. That is, even at a relatively low cell potential not producing lithium metal in the presence of only lithium chloride, lithium metal is produced at the cathode through the electrolysis in the presence of lithium oxide and lithium chloride together. Upon the electrolysis, the cathodic current at which lithium metal is produced becomes higher in proportional to the amount of lithium oxide obtained as the by-product. Hence, the measurement of the cathodic current leads to determination of the amount of lithium oxide as the by-product, consequently the conversion yield of uranium from uranium oxides can be determined.

In the present invention, by use of the measuring device composed of the potentiostat/galvanostat and the reactor provided with the anode and the cathode, the conversion yield of uranium metal is determined through the electrochemical analysis based on the oxidation of the oxygen ion and the reduction of the lithium ion dissociated as in Reaction 2.

The oxygen gas is produced at the anode. As such, the anode is formed of or surface-treated with an inactive metal selected from the group consisting of platinum (Pt), gold (Au), iridium (Ir), palladium (Pd) and rhodium (Rh), carbon (C) and glassy carbon; or alloys thereof, or mixtures thereof. Preferably, an inactive metal, such as platinum, gold, iridium, palladium and rhodium, or glassy carbon, is used.

At the cathode, the lithium ion is reduced to lithium metal. In such cases, the cathode is formed of or surface-treated with a metal selected from the group consisting of iron (Fe), nickel (Ni), cobalt (Co), chromium (Cr), zirconium (Zr), titanium (Ti) and stainless steel; or alloys thereof, or mixtures thereof. In particular, preferable is use of a metal including iron, nickel, cobalt, chromium, zirconium, titanium and stainless steel, or alloys thereof.

Further, the present invention adopts the electrochemical analysis by oxidation-reduction of lithium oxide obtained as the by-product of the reduction process of uranium oxides.

The above electrochemical method is classified into controlled potential techniques and controlled current techniques. The electrochemical method as controlled potential techniques is exemplified by chronoamperometry, chronocoulometry, linear sweep voltammetry, or cyclic voltammetry. In addition, the electrochemical method as controlled current techniques is composed of chronopotentiometry.

Of the electrochemical methods, the chronoamperometry is preferably used. As such, the predetermined electrostatic potential of 0.5-4.0 V, and preferably, 1.0-3.0 V, is applied to the electrode. Within such an electrostatic potential range, lithium metal is produced at the cathode. If the potential is too low, the reduction of the lithium ion does not occur. Whereas, if the potential is extremely high, the cathodic current is obtained by lithium chloride as well as lithium oxide. Hence, the control of the potential range is important to measure only the current in proportion to the amount of lithium oxide obtained as the by-product. The above potential is shown as $E_{step}(E_a-E_c)$ in which $E_a$ and $E_c$ are the potential of anode and cathode, respectively.

In the cases of chronopotentiometry as controlled current technique, while the current of tens of to hundreds of mA flows, potential variation with time is measured. At an initial state, since lithium oxide is hardly present, the current cannot reach a desired level by only the amount of lithium oxide. Thus, the cell potential has a high potential value which induces oxidation-reduction of lithium chloride. On the other hand, as the reduction of uranium oxide occurs, the amount of lithium oxide as the by-product is increased, and hence, the potential is gradually decreased to a low potential value inducing oxidation-reduction of the dissociated ions of lithium oxide.

Further, the reaction of the present invention which takes place in the presence of the high-temperature molten salt may use any chlorides. In particular, the chloride salt is preferably selected from the group consisting of LiCl, KCl, NaCl, $CaCl_2$, $MgCl_2$, and mixtures thereof. Such a high-temperature molten salt is formed at 300-1200° C., and preferably, 400-1000° C.

A better understanding of the present invention may be obtained through the following example which is set forth to illustrate, but is not to be construed as the limit of the present invention.

EXAMPLE 1

Measurement of Conversion Yield of Uranium from Uranium Oxide 300 g of lithium chloride and 31.6 g of uranium oxide ($U_3O_8$) were introduced into a stainless reactor, after which the temperature in the reactor was increased to 650° C. under argon gas atmosphere to melt lithium chloride. An anode formed of a platinum wire and a cathode formed of iron (Fe) were placed into the reactor, and then connected to a potentiostat/galvanostat. Subsequently, 7 g of lithium metal was further added into the reactor, and cathodic current variation versus time was continuously measured at electrostatic potential of 2.0 V.

Figure 2:
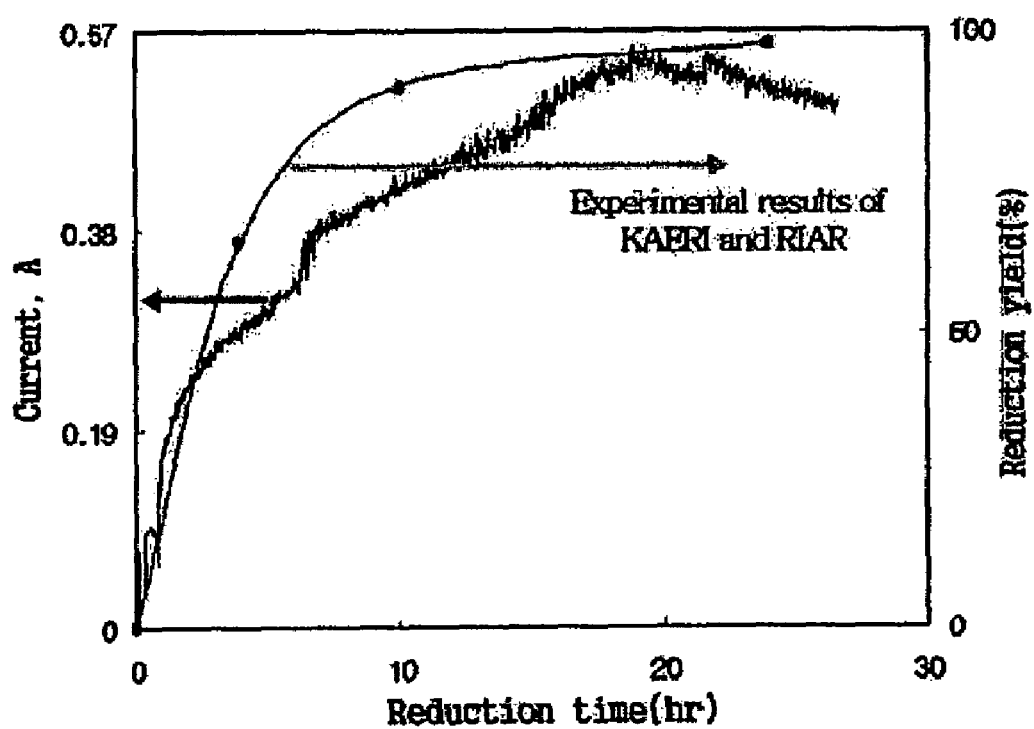
FIG. 2 is a graph showing current variation versus time at a predetermined potential upon reduction of $U_3O_8$ by lithium metal, according to the present invention, and a conversion yield of uranium obtained by a conventional wet analytical method.

The above cathodic current results are depicted in FIG. 2. In addition, to compare the above current results of the present invention with the experimental results by the conventional wet analytical method, FIG. 2 depicts the results of reduction experiment by the wet analytical method using spent fuel, provided jointly by Korea Atomic Energy Research Institute (KAERI) and Research Institute for Atomic Reactors (RIAR) of Russia.

As shown in FIG. 2, since a concentration of lithium oxide no longer increases when the reduction of uranium oxide is completed, the cathodic current due to lithium oxide no longer increases. At this time, because the concentration of lithium oxide decreases by electrolysis rather than increasing, the cathodic current gradually decreases. This level-off point of the cathodic current means that uranium oxide is completely reduced to uranium metal. From the above drawing, it can be seen that a reduction yield obtained by a conventional measurement method reaches the maximum value at the largest cathodic current.

Hence, the current when the lithium ion dissociated from lithium oxide is reduced to lithium metal is measured, whereby the conversion yield of uranium from uranium oxide can be in-situ measured.

Additionally, to investigate the resultant product of the reduction process of the present invention, the product was washed with distilled water and methanol, dried and then measured for diffraction patterns by use of an X-ray diffraction device. The results are given in FIG. 3.

Figure 3:
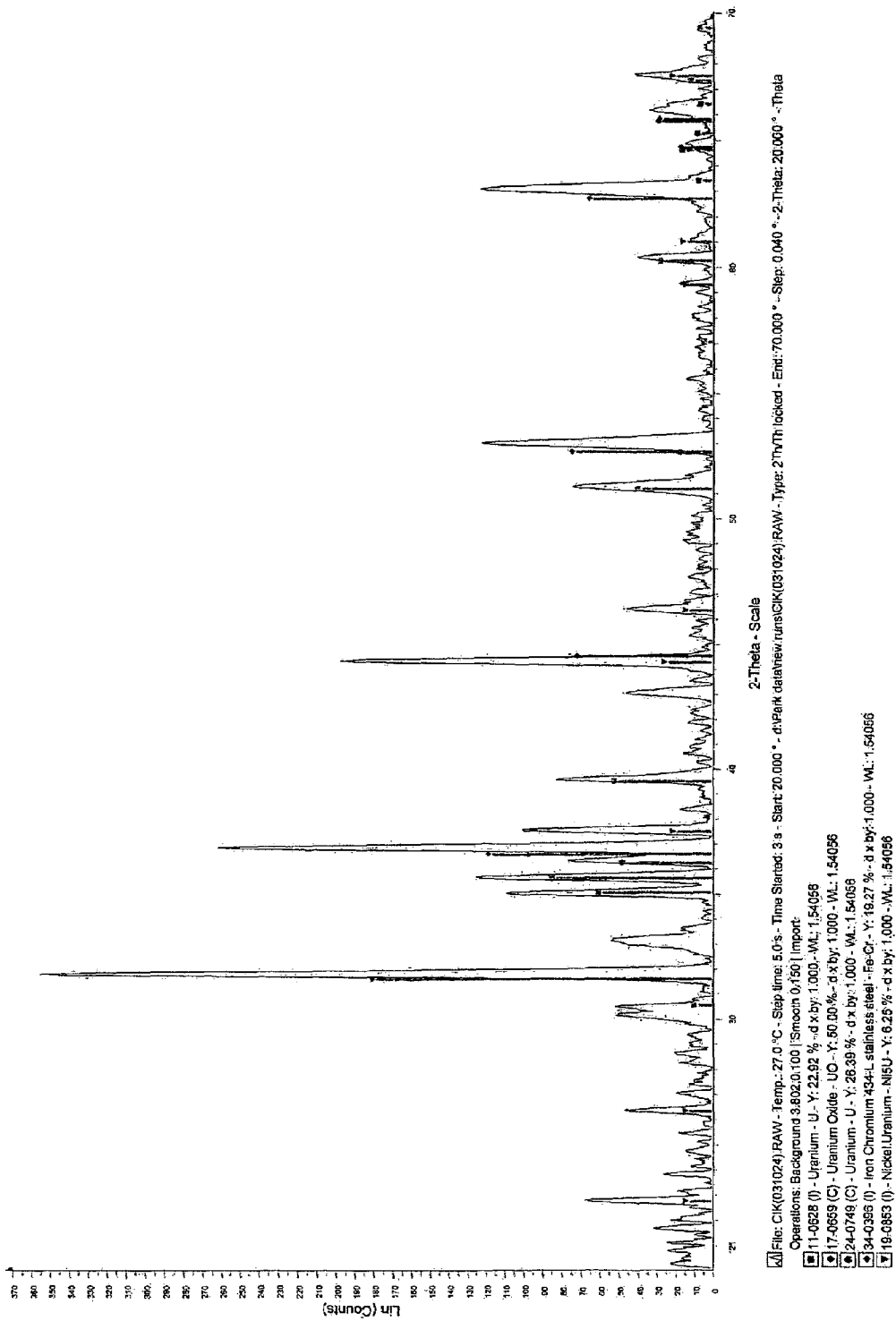
FIG. 3 is a graph showing an X-ray diffraction pattern of a reduced product after measurement of FIG. 2.

As apparent from FIG. 3, although the surface of uranium metal is partially oxidized when residual lithium chloride and lithium oxide in uranium metal is washed away using distilled water, X-ray diffraction patterns of $UO_2$ and $U_3O_8$ cannot be found in the above drawing. Thus, FIG. 3 represents characteristic X-ray diffraction patterns of uranium metal and the patterns of U-Ni alloy by Ni used for the reactor and parts of uranium metal.

As described above, the present invention provides a method of in-situ monitoring the reduction process of uranium oxides by lithium metal, which is advantageous in terms of fast and simplified measurement of a conversion yield of uranium from uranium oxides. Further, since such a conversion yield can be directly measured in the presence of a high-temperature molten salt by use of a measuring device including an anode and a cathode connected to a potentiostat/galvanostat, the reduction process can be in-situ monitored.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method of measuring a conversion yield of uranium metal from uranium oxides upon production of uranium metal and lithium oxide resulting from a reaction of uranium oxides ($UO_x$, $x \leq 3$) with lithium metal in the presence of a high-temperature molten salt, according to an electrochemical analysis based on an oxidation of a dissociated oxygen ion and a reduction of a dissociated lithium ion as represented by Reaction 2, below, by use of a measuring device including a potentiostat/galvanostat and a reactor provided with an anode and a cathode:

Reaction 2

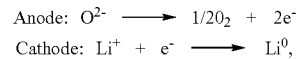

Anode: $O^{2-} \longrightarrow 1/2 O_2 + 2e^-$
Cathode: $Li^+ + e^- \longrightarrow Li^0$, wherein the electrochemical analysis comprises chronoamperometry, chronocoulometry, linear sweep voltammetry, or cyclic voltammetry.

2. The method according to claim 1, wherein the anode is formed of or surface-treated with an inactive metal selected from the group consisting of platinum, gold, iridium, palladium and rhodium, carbon, and glassy carbon; or alloys thereof, or mixtures thereof.

3. The method according to claim 1, wherein the cathode is formed of or surface-treated with a metal selected from the group consisting of iron, nickel, cobalt, chromium, zirconium, titanium, and stainless steel; or alloys thereof, or mixtures thereof.

4. The method according to claim 1, wherein the electrochemical analysis comprises chronoamperometry.

5. The method according to claim 4, wherein the chronoamperometry is used to measure cathodic current versus time at electrostatic potential of 0.5-4.0 V.

6. The method according to claim 4, wherein the chronoamperometry is used to measure cathodic current versus time at electrostatic potential of 1.0-3.0 V.

7. The method according to claim 1, wherein the high-temperature molten salt comprises LiCl, KCl, NaCl, $CaCl_2$, $MgCl_2$, or mixtures thereof.

8. The method according to claim 1, wherein the high-temperature molten salt is formed at 300-1200° C.

* * * * *

UNITED STATES PATENT AND TRADEMARK OFFICE
CERTIFICATE OF CORRECTION

PATENT NO. : 7,390,392 B1
APPLICATION NO. : 10/862253
DATED : June 24, 2008
INVENTOR(S) : In-Kyu Choi et al.

Page 1 of 1

It is certified that error appears in the above-identified patent and that said Letters Patent is hereby corrected as shown below:

Item (57) on the Title page, in the Abstract, line 5, "($UO_x$, $x \leqq 3$)" should be corrected to read -- ($UO_x$, $x \leq 3$) --.

Column 2, line 49, "($UO_x$, $x \leqq 3$)" should be corrected to read -- ($UO_x$, $x \leq 3$) --.

Column 3, line 18, "($UO_x$, $x \leqq 3$)" should be corrected to read -- ($UO_x$, $x \leq 3$) --.

Column 6:
Claim 1 line 19, "($UO_x$, $x \leqq 3$)" should be corrected to read -- ($UO_x$, $x \leq 3$) --.

Signed and Sealed this

Sixteenth Day of September, 2008

JON W. DUDAS
*Director of the United States Patent and Trademark Office*